R. VARLEY.
METHOD OF MAKING COILS.
APPLICATION FILED OCT. 14, 1911.
1,073,059.
Patented Sept. 9, 1913.
3 SHEETS—SHEET 2.
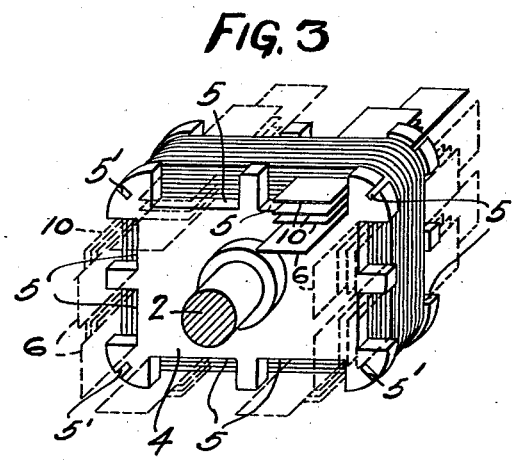
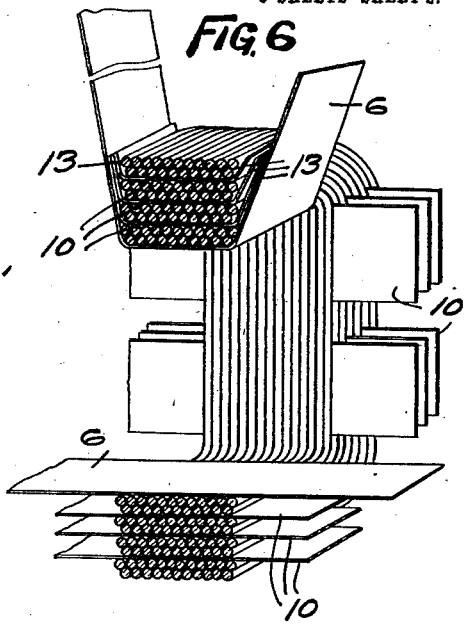
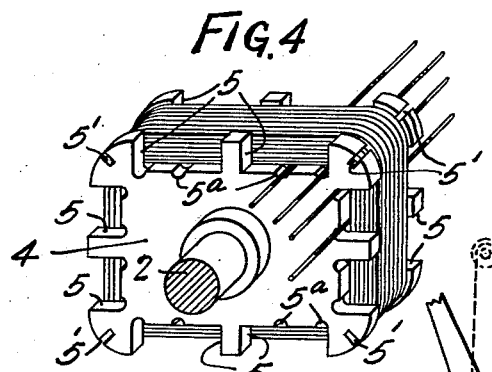
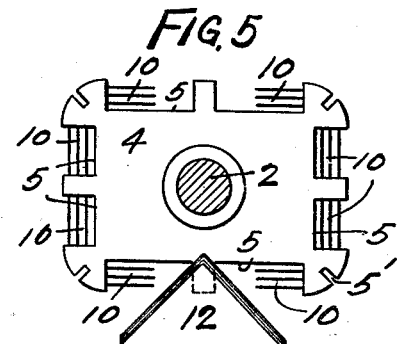
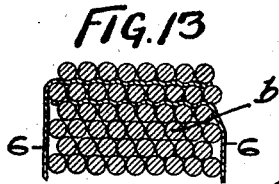
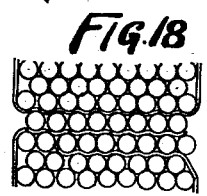
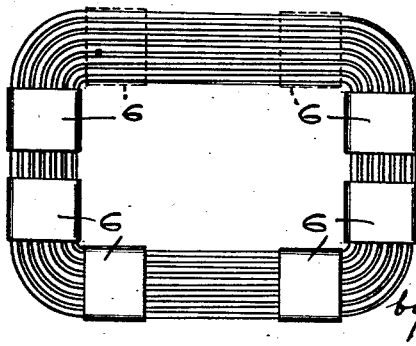
WITNESSES.
INVENTOR.
Richard Varley
by Bakewell & Keller
his attys R. VARLEY.
METHOD OF MAKING COILS.
APPLICATION FILED OCT. 14, 1911.
1,073,059.
Patented Sept. 9, 1913.
3 SHEETS—SHEET 3.
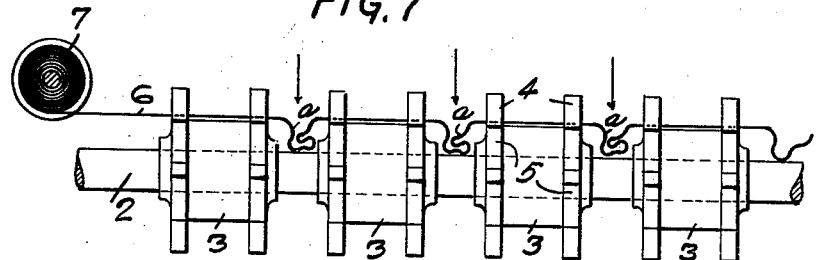
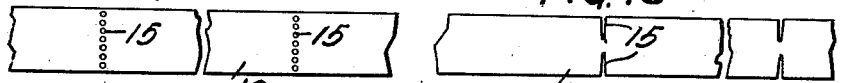
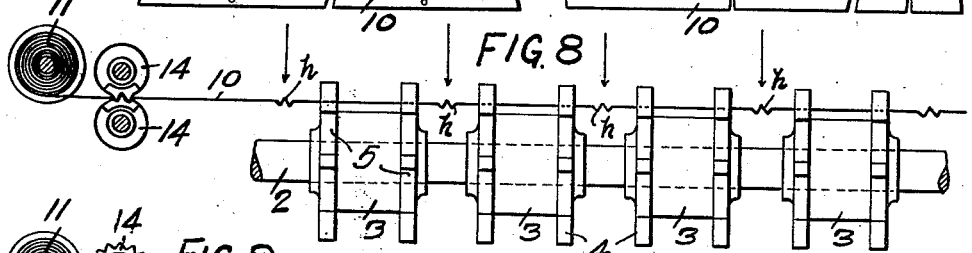
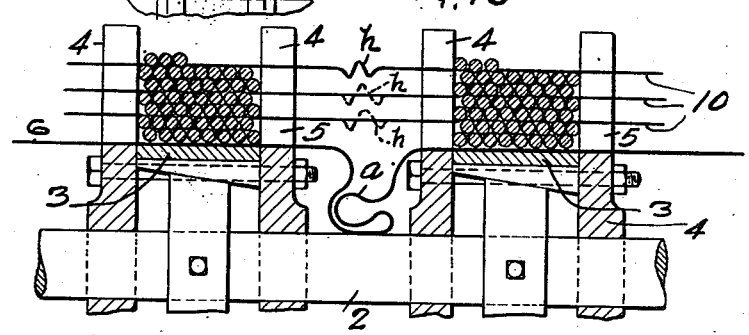
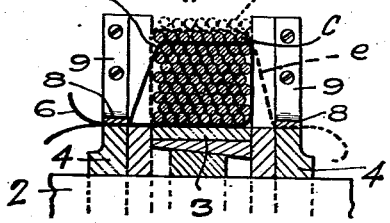
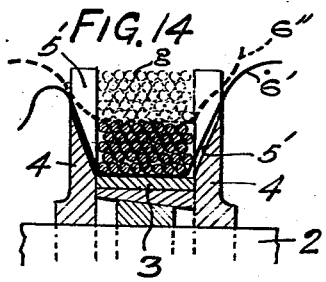
WITNESSES.
INVENTOR.

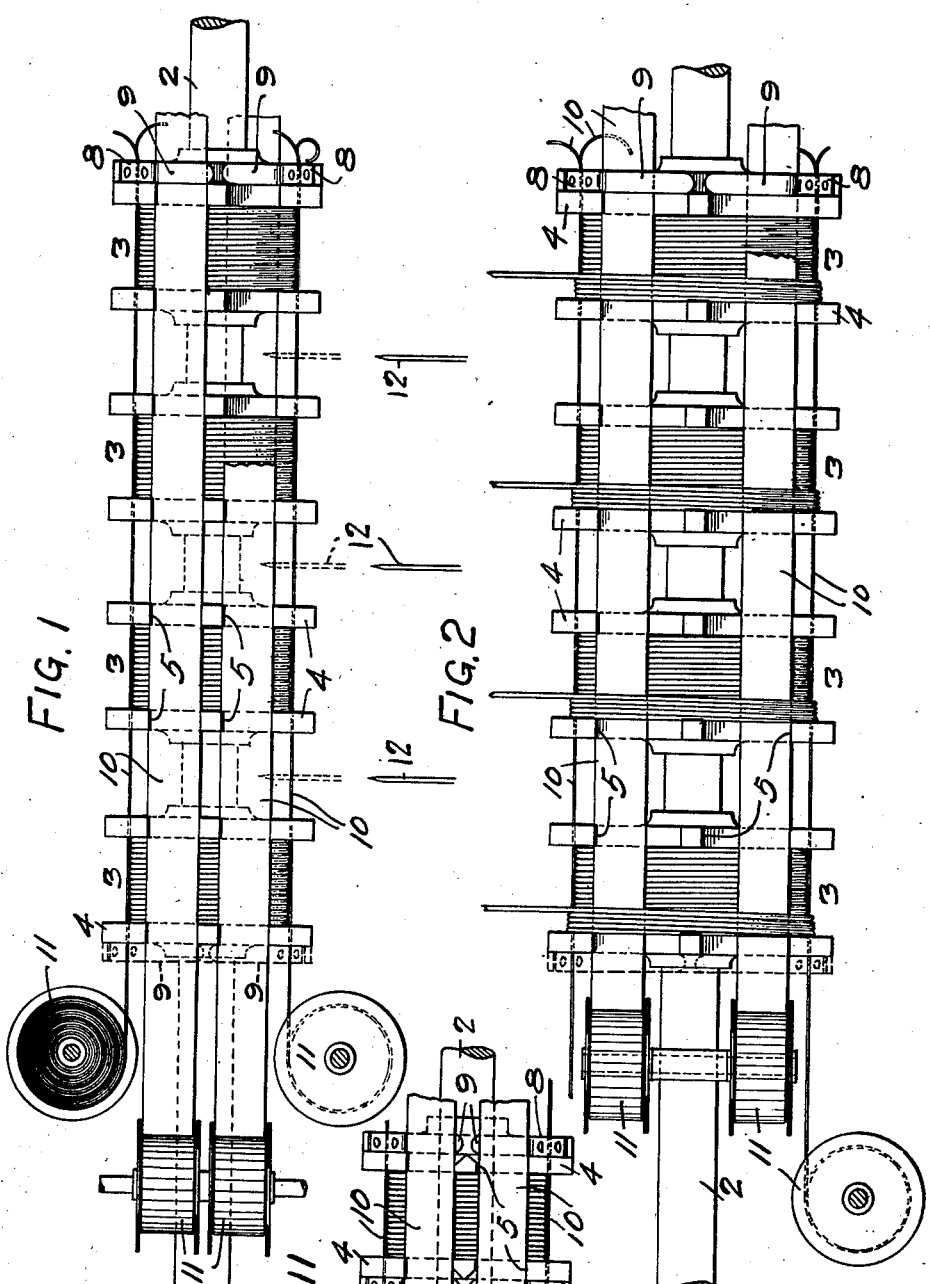

UNITED STATES PATENT OFFICE.

RICHARD VARLEY, OF ENGLEWOOD, NEW JERSEY, ASSIGNOR TO VARLEY DUPLEX MAGNET COMPANY, OF JERSEY CITY, NEW JERSEY, A CORPORATION OF NEW JERSEY.

METHOD OF MAKING COILS.

1,073,059.

Specification of Letters Patent.

Patented Sept. 9, 1913.

Application filed October 14, 1911. Serial No. 654,752.

*To all whom it may concern:*

Be it known that I, RICHARD VARLEY, a citizen of the United States of America, and residing at Englewood, in the county of Bergen and State of New Jersey, have invented a new and useful Method of Making Coils, of which the following is a full, clear, and exact description, reference being had to the accompanying drawings, which form part of this specification.

My invention, subject of this application, is a method of making electric coils and it has for its primary object the formation of coils in which the cross-sectional shape or symmetrical "block" formed by the symmetrical superposition of one layer of winding on another is lastingly preserved to the coil under all conditions of manipulation and use.

In the making an electric coil is usually wound upon the coil-former or mandrel, under tension, and in its removal from the mandrel reactional strains are thereby set up which tend to misshape its cross-sectional design. Strains also arise in subsequent handling and the application or impregnation of insulation, which also readily distort, in the ordinary coil, its cross-sectional shape. This distortion or bulging of the grouped or bunched wire presents not only a difficulty in adapting the malformed coil to apparatus in which standard or fixed dimensional coil space obtains, but also causes undesirable variations in predetermined voltage or potential capacity of the coil.

The above-mentioned difficulties, while arising in coils for practically all electric apparatus, are peculiar to, and clearly instanced in, the case of static transformers in which, as is commonly known, the capacity of transformation is dependent upon the size and the relative number of turns of wire in the coils for determination of the ratio of conversion of the potential or voltage. In transformer coils, the requirement that the coil be symmetrical and compact in cross-sectional shape arises not only from the desirability of keeping the transformer down to moderate size (by reason of the fact that the coil elements change as to the cube of the linear dimensions while changes in the case occur as to the square of the linear dimensions), but also from the necessity of non-variation of predetermined capacity or ratio of transformation, for distortion of the coil places the wire of different layers of the winding in such irregular juxtaposition as to vary the potential of the coil.

It has been the practice to interpose thick insulation between different layers so as to preserve the potential difference of these different layers, but such spacing results in undue increase in size of the coil and consequent undesirable enlargement of apparatus.

By my method of making coils I am able to form a coil which will retain its true initial shape without the aid of means which abnormally increase the size thereof.

With the above objects in view I aim to provide a method by which coils may be quickly and accurately formed of any desired gage of winding and which enables their formation either singly or in multiple manner.

In the accompanying drawings I have illustrated preferable apparatus which may be employed in carrying out my invention. It will be premised, however, that different and distinct forms of apparatus may be employed and that changes may be made in the apparatus shown without departing from my invention. It will also be understood that my invention is not limited to the production of any particular form or character of coil; the invention being equally applicable to the making of dynamo, motor, transformer and other induction coils.

Figure 1 is a side elevation of a plurality of coiling mandrels or formers which may be employed in carrying out my invention; in this view I indicate a plurality of coils in the progress of making; Fig. 2 is a top plan view of the same; Fig. 3 is a perspective view, partly in section, showing a coil wound upon a former and having, partly in full lines and partly in dotted lines, indicated binding element incorporated in the coil; Fig. 4 is a similar view showing modified manner of applying narrow external binding elements to the coil, such as small wire strands; Fig. 5 is a sectional view indicating in diagram the manner of severing the binding element, intermediate a plurality of formers; Fig. 6 is a sectional perspective view of a coil in the condition it assumes preparatory to the finishing operation and before it is removed from the former; Fig. 7 is a diagrammatic elevational view showing a plurality of coil formers and manner of presenting the final or exterior binding element to the coil formers preparatory to winding of the coil; Fig. 8 is a similar view showing manner of presenting binding material to the formers in the progress of the formation of coils; Fig. 9 is a similar but fragmentary view showing modified manner of incorporating the binding element in the coil; Fig. 10 is a sectional view through a plurality of formers and indicating manner of applying a common binding element to the plurality of coil formers; Fig. 11 is a fragmentary view corresponding with Fig. 1 but showing means whereby a supply of binding material may be operatively carried by the coil former and also showing the former as having individual clamping means for holding the exterior binding element during the making of the coil, as will be hereinafter more fully brought out; Fig. 12 is a sectional view corresponding with Fig. 10 but showing manner of tying or terminally anchoring the exterior binding element; Fig. 13 is a fragmentary sectional view of a coil showing the exterior binding element terminally anchored or held against displacement by the layers of the winding, and as applied in the manner indicated in Fig. 12; Fig. 14 is a sectional view of a coil former on a line extending radially from the center of the coil former to the corner thereof and indicating modified manner of applying binding tape; as preferably for corner binding of the coil; Fig. 15 is a plan view of a section of binding strip of modified form; Fig. 16 is a similar view indicating another form of binding strip, both forms to be hereinafter more fully referred to; Fig. 17 is an elevational view of a finished coil made in accordance with my invention; and Figs. 18 and 19 are sectional views of coils showing modified manner of applying binding tapes, and to be hereinafter more fully referred to.

In carrying out my invention I may form a single coil or form a plurality of coils contemporaneously. Broadly stated, I may first present to a coil mandrel or former an exterior binding strip or strand preparatory to winding of the wire. I then apply the winding in superposed layers of conductor turns, and during the progress of winding apply an interior binding element preferably uniformly spaced at intervals in the development of the winding. These interior binding strips may comprise thin strips of paper, cambric, or very thin fiber-board and I preferably so incorporate them in the coil as to allow of end or terminal extensions beyond the body of the coil, that is, beyond its axial faces, which extensions may be bound tightly to and reinforce against displacement the side exterior wires of the coil by means of the first mentioned exterior binding element which may comprise adhesive tape or strip or may take the form of suitable ductile wire. If wire is employed as an exterior binder and is fed to the mandrel preparatory to the coiling operation, a mandrel or former such as shown in Fig. 4 may be employed, which mandrel is shown as having notches or recesses 5ª to accommodate such wires. For the sake of convenience the exterior and interior binding elements may be termed primary and secondary, respectively.

While the above description is a broad statement of my invention, I do not wish to be understood as limiting myself to the application of any number of binding strips nor to the application of binding strips to any particular point or points in the coil; it being apparent that the number and position of the strips may be varied as desired and be dependent upon the character of the coil concerned.

I have stated that different forms of apparatus may be employed in carrying out my method but the apparatus illustrated is desirable by reason of the particular provision made for enabling quick and accurate application of the binding elements. Such apparatus, described in my co-pending application, Serial No. 654,755 I will now refer to generally in delineating the manner of forming coils by my method.

The numeral 2 represents a rotatory shaft or spindle as forming the main operative element of a coiling machine. Carried by the spindle 2 are coil mandrels or formers 3 which may be of the usual construction in so far as concerns their separability for the removal of completed coils. These formers are usually provided with end disks or plates 4, the spacing of which from one another determines the length of the coil to be wound thereon. In these disks 4 I form recesses 5 which preferably extend from the periphery of the disk to the body of the former as shown in Fig. 10. The recesses 5 enable binding tapes to be so presented and applied as to cause them to extend beyond the ends of the coil. This is an important feature of my method as it enables the application of tapes of length sufficient to overcome abortive binding or tying function arising from take-up or "drawing in" of the ends of tapes, due to the binding of the turns of winding of one layer on those of another layer.

In making the coil, the binding element 6 may be fed from a suitable source of supply 7 (see Fig. 7) such as a magazine or roll, and is presented to the mandrel or former 3 preparatory to application of the winding. To prevent displacement of the tape 6 clamping means 8 are employed to hold the tape at points outside of the winding zone of the former 3. As shown, these clamping means comprise spring-clips 9 under which the tape is inserted as it is fed to the former. In applying the tape 6 to a plurality of mandrels or formers 3, the formers are arranged so as to bring the recesses 5 in alining registration. This enables the tape 6 to be readily fed from a common source to the several mandrels. When applied to the mandrel in multiple or plural arrangement, I provide an overflow or reserve accumulation of the tape 6 at points $a$, (see Fig. 7), for the purpose of providing sufficient length of tape for wrapping around the superficial face of the coil when completed, instead of spacing the formers from one another a distance to provide such length of tape. After applying the tape 6 the winding is presented to the former in each case for the rotatory building of the coil, and at intervals in the progress of winding I feed binding tape or element 10 to the layers, preferably at uniform intervals through the body of the coil. This manner of applying the binding strip 10 is indicated in Figs. 1, 2, 8, 9, 10 and 11 and corresponds with the mode of applying the tape 6 in so far as feeding from a source of supply to a single mandrel or a plurality of mandrels or formers. The tape 10 in passing from a source of supply 11 is applied across the layer or layers of winding lengthwise of the coil and held against displacement by the binding clips 8, after which succeeding layers of winding may be applied to the coil and the application of binding tape 10 then repeated, the alternate application of winding and binding element being dependent upon the size of the coil and the number of binding strips desired to be incorporated therein.

In Figs. 18 and 19 I show manner of tying the coils in sections. A part of the coil may be wound to form layers of any particular size and shape and then bound by a tape 10 after which other portions of the coil may be progressively wound and bound in a similar manner. The sections so wound and tied may be symmetrically apportioned or not, as desired. The view illustrated in Fig. 19 indicates how certain portions of the coil may be so wound as to cause the tied or bound portions to embrace and support against displacement an intermediate layer of winding $i$.

Where a plurality of forming mandrels are uniformly operated as indicated in Figs. 1, 2, 7, 8, and 10, after the coils have been completed, or substantially completed, and it is desired to remove them from the formers, the strips of binding element 10 which are tightly incorporated in the coils and which extend between the coils from one former to another, are severed preferably symmetrically at these points intermediate the formers. This severing of tape 10 may be effected by rotating the mandrels or formers during which severing apparatus such as knives 12 may be presented to the tapes. This is clearly indicated in Figs. 1 and 5. In Fig. 5 the knife 12 is shown as comprising a pivoted blade which may be moved into and out of the path of travel of the tapes 10 in the rotation of the shaft 2. The severing of the tapes 10 enables the exterior binding tape 6, when employed, to be severed at points between the coils and wrapped about each coil in the plane occupied by tapes 10. The sections of tape 10, carried by each coil, preferably are of such length as to provide the terminal portions 13 which may overlap at the end faces of the coil the superposed layers of winding as the tape 6 is drawn taughtly and tied to the body of the coil, or as I have brought out above, the ends of the tapes 10 may be bound within the coil, as indicated in Figs. 18 and 19.

In Fig. 13 the coil $b$ is shown as having the exterior binding tape 6 terminally anchored among the final layers of the winding of the coil. An advantageous feature of this manner of tying or fastening the tape 6 is that the terminal portions of the tape are firmly locked in the coil in a self-contained manner similar to the locking of the tape 10 as indicated in Figs. 18 and 19. This locking effect of the tape 6 is illustrated in Fig. 12 in which is shown the former 3 as being provided with tape clamping means 8 disposed at each side thereof so that the end of the tape 6 may be passed over the top of the coil as clearly shown and held under a clamp while a layer $c$ of wire is applied after which the tape 6 may be severed at a point practically flush with the side or end of the coil, as at $d$, and the opposite end $e$ of the tape 6 then passed over the coil and held by the other clamp 9, while a final or finishing layer $f$ of winding may be applied. Of course, any suitable adhesive binder 6 may be employed, such as adhesive cambric, or the binder may be wrapped about the coil and tied by other separate means. In anchoring the tape 6 within the coil it is desirable that the tape be held taughtly across the coil in the application of the final layers of winding or such layers of winding as serve to lock the tape, by clamping means at each side of the former as shown in Figs. 11 and 12, so as to cause the tape to bind tightly on the coil as the application of turns of the layer of winding draws the ends of the tape inwardly. This manner of holding the tape by clamping means may obtain in the case of locking or fastening the tapes 10 when applied as shown in Figs. 18 and 19.

In building up coils according to the present invention, the binding elements are best fed to the coils, as shown, in a direction parallel to the axis of the mandrel or alined mandrels, as the case may be; that is, transverse to the conductor turns.

The binding or tying of the coil against distortion is preferably at uniform points or intervals along the body of the coil as indicated by the positions of the binding strips 6 in Fig. 17. This is clearly brought about by employing a suitable guide, such as the recesses 5, uniformly or symmetrically disposed in the members 4. The recesses 5 guide the binding element in its application to the coil so that the different layers of the tapes may be disposed in a superposed manner at desired points throughout the coil.

My method is readily adaptable to the formation of coils of angular shape, that is, coils having angular openings such as the coil shown in Fig. 17. In the binding of such coils I preferably bind them contiguous to the corners thereof, along straight portions of the body of the coil. This manner of tying the coil without bringing the binding tapes within the zone of the curved corner portions of the winding enables the formation of an angular coil having true shape and compact in size, for it allows the turns of the winding to geometrically position or adjust themselves as they draw across or over the corner portion of the coil. With the corners free from the binding tape the turns symmetrically contact with one another in a staggered or alternating manner at these points so that the layers are evenly and uniformly applied, resulting in the ability to wind coils of a determined or given number of layers having also a required number of turns. These conditions make it possible to wind a coil for any certain predetermined electric capacity. As the turns are held in proper relationship at the corners of the coil, the crossing of the winding (which necessarily takes place in the reciprocable feeding of the turns across the coil former to produce the layers) occurs in the body intermediate the corners, thereby resulting in a long or moderate crossing effect which does not abruptly bend the wire or irregularly pile up the winding at these crossing points. Application of binding material to the corner of the coil also results in bulky and unsymmetrical corner formation due to the fact that the radii of the corner turns of the winding are very small in most cases and produce uneven and center-bound condition of the tapes at the corner or corners of the coil. By binding the coil at these points contiguous to the corner arcs of the turns of wire the binding tape operatively contacts throughout its whole width with the straight, (or moderate curve) or substantially straight, portions of the winding, resulting in efficacious binding action. While tapes of different widths may be employed for different size coils this binding of the coil at points contiguous to the curvilinear portions thereof permits of the preferable employment of tapes of a constant unit of width for coils of various sizes.

In certain size angular coils there is present sometimes a tendency to spreading or fanning out of the corner portions of the coil upon its removal from the former or mandrel. This may be overcome by binding the corner of the coil with a narrow binding strip so incorporated therein as to not vary the shape of the corner. In Fig. 14 I have shown manner of applying such binding which consists in preferably first applying a binding strip 6′ to the corner of the coil former before the application of the winding. I then wind a portion of the coil, as shown in full lines, and then bind the tape 6′ about the same in such manner as to have its ends overlap along a layer or turns of the winding, after which I apply a second and similar binding tape 6″ and proceed with the winding operation and, if desired, anchor the ends as in the case of a tape 6 as indicated in Figs. 12 and 13 or tapes 10 as indicated in Figs. 18 and 19. To provide an interlock between the two tapes 6′ and 6″ and the body of the coil, one or two turns of the winding of the second half portion g of the coil may be applied before the application of the tape 6″, thereby causing the turns of wire to lock the ends of the first mentioned tape 6′ before the application of the tape 6″ and the finishing of the coil. As the tapes 6′ and 6″ are applied to the corners of the mandrel, the coil former shown is formed with the corner recesses 5′ similar to the recesses 5. The fastening or interlocking of tapes 6′ and 6″ may also apply to the application of tapes 10 or tapes 6 and 10.

As shown in Fig. 9 the tapes 10 may be corrugated as they pass from the source of supply 11 to the coil formers so that the tapes may readily adjust themselves to the cross-sectional contour of the turns of wire comprising the layers of the winding. This, of course, is only necessary in the case of wire of materially large gage, for the reason that in large gage wire the application of the turns of wire is made in an alternate or staggered manner so that one turn lies interjacent opposing turns and effects corrugation of the tapes 10 with resultant travel or movement of the tapes as the turns are applied. Unless provision is made to allow of this corrugation without injurious strains on the tape, fracture of the tape might occur at points within the coil and thereby appreciably affect the binding action of those members. To overcome this effect I either corrugate the tape 10 as shown in Fig. 9, in a continuous manner so as to bring about the adjustment above described, or corrugate it at points intermediate the coil formers so as to permit of corrugations h to straighten out under the travel or creeping movement of the tape due to the application of the wire and thereby relieve said tapes from injurious strains. This is clearly indicated in Figs. 8 and 10, the latter view illustrating the take-up movement of the tape in the winding of the coil. The tapes 10 may be corrugated in any suitable manner such as by passing through corrugating means or rolls 14 from the source of supply 11 to the coil formers.

In lieu of corrugating the tape 10 it may be so perforated as indicated by the numeral 15 in Figs. 15 and 16, at points intermediate the formers that it will separate under the corrugating action of the winding. In fact, this manner of severing the tape is a desirable feature in that it would require no separate cutting operation for the tapes.

By retaining the shape and compacting the size of the coil proper geometrical and dimential construction of the coil is had with resultant overcoming of potential variation.

I do not desire to claim in this application the apparatus shown in connection with my method, as such mechanism forms subject-matter of my above-mentioned co-pending application, Serial No. 654,755 and also my co-pending application, Serial No. 654,753.

Many changes may be made in the invention without departing from its true spirit. Coils may be formed with interior binding tape incorporated therein and then removed from the mandrel or former and subsequently bound by exterior tape or other means and other changes may be made in the manner of applying the binding elements. For instance, either tapes 10 or 6 may be employed alone to bind the coil. Coils wound in accordance with the method hereinbefore described may be removed from their respective winding mandrels and may be subsequently handled to any necessary extent without undergoing distortion as a whole or without displacement of the layers of turns relative to each other.

What I claim and desire to secure by Letters Patent is:

1. A method of making electric coils which comprises winding a plurality of conductors into coils on a plurality of coil-formers, feeding a continuous binding element to the coil-formers and into contact with the conductors in the progress of winding, and adjusting the portions of the binding element between the coil-formers in such manner as to permit the necessary take-up or creep of said binding element on the coil-formers to occur without rupture of the binding element in the body of a coil.

2. A method of making electric coils which comprises winding a plurality of conductors into coils on a plurality of coil-formers in substantially axial alinement, feeding a continuous binding element to the coil-formers and into contact with the conductors in the progress of winding and in a direction approximately parallel to the common axis of the coil-formers, and adjusting the portions of the binding element between the coil-formers in such manner as to permit the necessary take-up or creep of said binding element on the coil-formers to occur without rupture of the binding element in the body of the coil.

3. A method of making electric coils which comprises winding a plurality of conductors into coils on a plurality of coil-formers, feeding a continuous binding element to the coil-formers and into contact with the conductors in the process of winding, and providing reserve portions of said binding element between the coil-formers in order to permit the necessary take-up or creep of said binding element on the coil-formers to occur without rupture of the binding element in the body of a coil.

4. A method of making electric coils which comprises winding turns of a conductor on a suitable mandrel to form a layer, placing a binding element in contact with such layer and holding the same in position with yielding tension so adjusted as always to be less than the breaking strength of said binding element, and winding another layer of conductor turns on the binding element thus held, whereby the creep of the binding element caused by the application of the second layer may occur without rupture of the binding element between the layers.

In testimony whereof, I have hereunto set my hand.

RICHARD VARLEY.

Witnesses:
M. A. BARTH,
M. A. KELLER.